US012665729B2

(12) United States Patent
Luo et al.

(10) Patent No.: US 12,665,729 B2
(45) Date of Patent: Jun. 23, 2026

(54) REFERENCE SIGNAL INDICATION METHOD AND APPARATUS, COMPUTER-READABLE STORAGE MEDIUM, AND COMPUTER PROGRAM

(71) Applicant: HUAWEI TECHNOLOGIES CO., LTD., Shenzhen (CN)

(72) Inventors: Zhihu Luo, Beijing (CN); Zhanzhan Zhang, Shanghai (CN); Zhe Jin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 350 days.

(21) Appl. No.: 18/345,831

(22) Filed: Jun. 30, 2023

(65) Prior Publication Data

US 2023/0344611 A1 Oct. 26, 2023

Related U.S. Application Data

(63) Continuation of application No. PCT/CN2020/141826, filed on Dec. 30, 2020.

(51) Int. Cl.
*H04L 5/00* (2006.01)
*H04W 68/02* (2009.01)
(Continued)

(52) U.S. Cl.
CPC .......... *H04L 5/0092* (2013.01); *H04L 5/0048* (2013.01); *H04W 68/02* (2013.01); *H04W 72/232* (2023.01); *H04W 76/28* (2018.02)

(58) Field of Classification Search
CPC .... H04L 5/0092; H04L 5/0048; H04W 76/28; H04W 72/232; H04W 68/02
See application file for complete search history.

(56) References Cited

U.S. PATENT DOCUMENTS

2016/0330791 A1 11/2016 Vajapeyam et al.
2021/0075659 A1* 3/2021 Gong ................... H04L 5/0051
(Continued)

FOREIGN PATENT DOCUMENTS

CN 110831162 A 2/2020
CN 111130741 A 5/2020
(Continued)

OTHER PUBLICATIONS

Huawei et al., "Assistance RS occasions for Idle/inactive mode," 3GPP TSG RAN WG1 Meeting #103-e, E-meeting, R1-2007601, Total 9 pages, XP009537934, 3rd Generation Partnership Project, Valbonne, France (Oct. 26-Nov. 13, 2020).
(Continued)

*Primary Examiner* — Chandrahas B Patel
(74) *Attorney, Agent, or Firm* — Leydig, Voit & Mayer, Ltd.

(57) ABSTRACT

A reference signal indication method and apparatus, a computer-readable storage medium, and a computer program are disclosed. In the method, a terminal device receives configuration information of a reference signal from a network device. The configuration information indicates at least one resource location of the reference signal. The terminal device further receives indication information of the reference signal from the network device. The indication information indicates whether the network device sends the reference signal at a first resource location. The at least one resource location includes the first resource location. According to the method, the terminal device can determine resource locations at which the network device sends the reference signal, to learn whether demodulation performance on a subsequent paging occasion (PO) that needs to be monitored can be ensured by receiving the reference signal.

12 Claims, 8 Drawing Sheets

(51) Int. Cl.
H04W 72/232 (2023.01)
H04W 76/28 (2018.01)

(56) References Cited

U.S. PATENT DOCUMENTS

2021/0105636 A1\*  4/2021  Yang ..................... H04W 16/14
2022/0322486 A1\*  10/2022  Park ........................ H04W 4/08

FOREIGN PATENT DOCUMENTS

CN      111385858  A    7/2020
CN      111585724  A    8/2020

OTHER PUBLICATIONS

VIVO "TRS/CSI-RS occasion(s) for idle/inactive UEs," 3GPP TSG
RAN WG1 #103-e, e-Meeting, R1-2007674, XP052349028, Total 9
pages, 3rd Generation Partnership Project, Valbonne, France (Oct.
26-Nov. 13, 2020).

\* cited by examiner

100 ⟍

110        120

REFERENCE SIGNAL INDICATION METHOD AND APPARATUS, COMPUTER-READABLE STORAGE MEDIUM, AND COMPUTER PROGRAM

CROSS-REFERENCE TO RELATED APPLICATIONS

This application is a continuation of International Application No. PCT/CN2020/141826, filed on Dec. 30, 2020, the disclosure of which is hereby incorporated by reference in its entirety.

TECHNICAL FIELD

This application relates to the field of mobile communication technologies, and in particular, to a reference signal indication method and apparatus, a computer-readable storage medium, and a computer program.

BACKGROUND

In a communication system, a terminal device in an idle state or in an inactive state needs to monitor a paging occasion in a discontinuous reception cycle. Before monitoring, the terminal device needs to complete synchronization with a network device to ensure demodulation performance. Usually, the terminal device may be woken up at a nearest synchronization signal block to perform synchronization, but then the terminal device needs to maintain obtained synchronization until an end of the paging occasion. Usually, there is a long interval between a synchronization signal block and a paging occasion. As a result, the terminal device wastes high power consumption during the interval. Therefore, there is an urgent need for a solution that enables the terminal device to obtain synchronization before the paging occasion with low power consumption.

SUMMARY

Embodiments of this application provide a reference signal indication method and apparatus, a computer-readable storage medium, and a computer program, to enable a terminal device to learn of resource locations at which a network device sends a reference signal, and further have an opportunity to obtain synchronization before a paging occasion by monitoring the reference signal.

According to a first aspect, an embodiment of this application provides a reference signal indication method. The method includes: receiving configuration information of a reference signal from a network device. The configuration information indicates at least one resource location of the reference signal. The method further includes: receiving indication information of the reference signal from the network device. The indication information indicates whether the network device sends the reference signal at a first resource location. The at least one resource location includes the first resource location.

The method may be performed by a first communication apparatus. The first communication apparatus may be a terminal device, or may be a communication apparatus that can support the terminal device in implementing a function required for the method. For example, the first communication apparatus may be a chip disposed in the terminal device.

According to the method, the terminal device can determine resource locations at which the network device sends the reference signal, to learn whether demodulation performance on a subsequent PO that needs to be monitored can be ensured by receiving the reference signal.

In an embodiment, the indication information is carried in downlink control information DCI received on a first paging occasion PO. Alternatively, the indication information is carried in a first signal received before the first PO. The first signal indicates whether the terminal device monitors a subsequent PO.

In an embodiment, the first resource location corresponds to a second PO. The second PO is at least one PO after the first PO.

In an embodiment, an interval between the first PO and the second PO is an integer multiple of a cycle of the reference signal; an interval between the first PO and the second PO is a discontinuous reception DRX cycle; an interval between the first PO and the second PO is a default DRX cycle; an interval between the first PO and the second PO is a minimum value in default DRX cycles; or an interval between the first PO and the second PO is a maximum value in default DRX cycles.

In an embodiment, an interval between the first resource location and the second PO is less than or equal to a first threshold. Alternatively, there is an offset value between the first resource location and the second PO.

In an embodiment, intervals between the first PO and different second POs are different DRX cycles.

In an embodiment, there is a one-to-one correspondence between a bit of the indication information and the second PO. Each bit indicates whether the network device sends the reference signal at a resource location that is in the at least one resource location and that corresponds to a second PO corresponding to the bit.

In an embodiment, the first resource location is a resource location that is in the at least one resource location and that is located in a first time period. The first time period is the interval between the first PO and the second PO. Alternatively, the first time period is at least one time period, and the at least one time period forms the interval between the first PO and the second PO.

In an embodiment, there is a one-to-one correspondence between the bit of the indication information and the first time period. Each bit indicates whether the network device sends the reference signal at a resource location that is in the at least one resource location and that is in a time period corresponding to the bit.

According to a second aspect, a reference signal indication method is provided. The method includes: sending configuration information of a reference signal to a terminal device. The configuration information indicates at least one resource location of the reference signal. The method further includes: sending indication information of the reference signal to the terminal device. The indication information indicates whether a network device sends the reference signal at a first resource location. The at least one resource location includes the first resource location.

The method may be performed by a second communication apparatus. The second communication apparatus may be the network device, or may be a communication apparatus that can support the network device in implementing a function required for the method. For example, the second communication apparatus may be a chip disposed in the network device.

According to the method, the terminal device can determine resource locations at which the network device sends the reference signal, to enable the terminal device to learn whether demodulation performance on a subsequent PO that needs to be monitored can be ensured by receiving the reference signal.

In an embodiment, the indication information is carried in downlink control information DCI received on a first paging occasion PO. Alternatively, the indication information is carried in a first signal received before the first PO. The first signal indicates whether the terminal device monitors a subsequent PO.

In an embodiment, the first resource location corresponds to a second PO. The second PO is at least one PO after the first PO.

In an embodiment, an interval between the first PO and the second PO is an integer multiple of a cycle of the reference signal; an interval between the first PO and the second PO is a discontinuous reception DRX cycle; an interval between the first PO and the second PO is a default DRX cycle; an interval between the first PO and the second PO is a minimum value in default DRX cycles; or an interval between the first PO and the second PO is a maximum value in default DRX cycles.

In an embodiment, an interval between the first resource location and the second PO is less than or equal to a first threshold. Alternatively, there is an offset value between the first resource location and the second PO.

In an embodiment, intervals between the first PO and different second POs are different DRX cycles.

In an embodiment, there is a one-to-one correspondence between a bit of the indication information and the second PO, and each bit indicates whether the network device sends the reference signal at a resource location that is in the at least one resource location and that corresponds to a second PO corresponding to the bit.

In an embodiment, the first resource location is a resource location that is in the at least one resource location and that is located in a first time period. The first time period is the interval between the first PO and the second PO. Alternatively, the first time period is at least one time period, and the at least one time period forms the interval between the first PO and the second PO.

In an embodiment, there is a one-to-one correspondence between the bit of the indication information and the first time period. Each bit indicates whether the network device sends the reference signal at a resource location that is in the at least one resource location and that is in a time period corresponding to the bit.

According to a third aspect, a communication apparatus is provided. The apparatus may include a module configured to perform the method in the first aspect or any embodiment of the first aspect, for example, a processing module and a transceiver module. The transceiver module may include a sending module and a receiving module. The sending module and the receiving module may be different function modules, or may be a same function module that can implement different functions. The processing module may be implemented by using a processor. The transceiver module may be implemented by using a transceiver. Correspondingly, the sending module may be implemented by using a transmitter, and the receiving module may be implemented by using a receiver. If the apparatus is a terminal device, the transceiver may be a radio frequency transceiver component in the terminal device. If the apparatus is a chip disposed in the terminal device, the transceiver may be a communication interface in the chip. The communication interface is connected to the radio frequency transceiver component in the terminal device, to implement information sending and receiving by using the radio frequency transceiver component.

According to a fourth aspect, a communication apparatus is provided. The apparatus may include a module configured to perform the method in the second aspect or any embodiment of the second aspect, for example, a processing module and a transceiver module. The transceiver module may include a sending module and a receiving module. The sending module and the receiving module may be different function modules, or may be a same function module that can implement different functions. The processing module may be implemented by using a processor. The transceiver module may be implemented by using a transceiver. Correspondingly, the sending module may be implemented by using a transmitter, and the receiving module may be implemented by using a receiver. If the apparatus is a network device, the transceiver may be a radio frequency transceiver component in the network device. If the apparatus is a chip disposed in the network device, the transceiver may be a communication interface in the chip. The communication interface is connected to the radio frequency transceiver component in the network device, to implement information sending and receiving by using the radio frequency transceiver component.

According to a fifth aspect, a communication system is provided. The communication system includes the terminal device according to the third aspect and the network device according to the fourth aspect.

According to a sixth aspect, a computer-readable storage medium is provided. The computer-readable medium stores a computer program. When code of the computer program is run on a computer, the computer is enabled to perform the method in the first aspect or any embodiment of the first aspect.

According to a seventh aspect, a computer-readable storage medium is provided. The computer-readable medium stores a computer program. When code of the computer program is run on a computer, the computer is enabled to perform the method in the second aspect or any embodiment of the second aspect.

According to an eighth aspect, a computer program product is provided. The computer program product includes a computer program. When the computer program is run on a computer, the computer is enabled to perform the method in the first aspect or any embodiment of the first aspect.

According to a ninth aspect, a computer program product is provided. The computer program product includes a computer program. When the computer program is run on a computer, the computer is enabled to perform the method in the second aspect or any embodiment of the second aspect.

BRIEF DESCRIPTION OF DRAWINGS

FIG. 3 (b) is another schematic diagram of power consumption in a process of monitoring paging;

5

6

Figure 6:
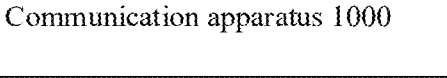
Figure 7:
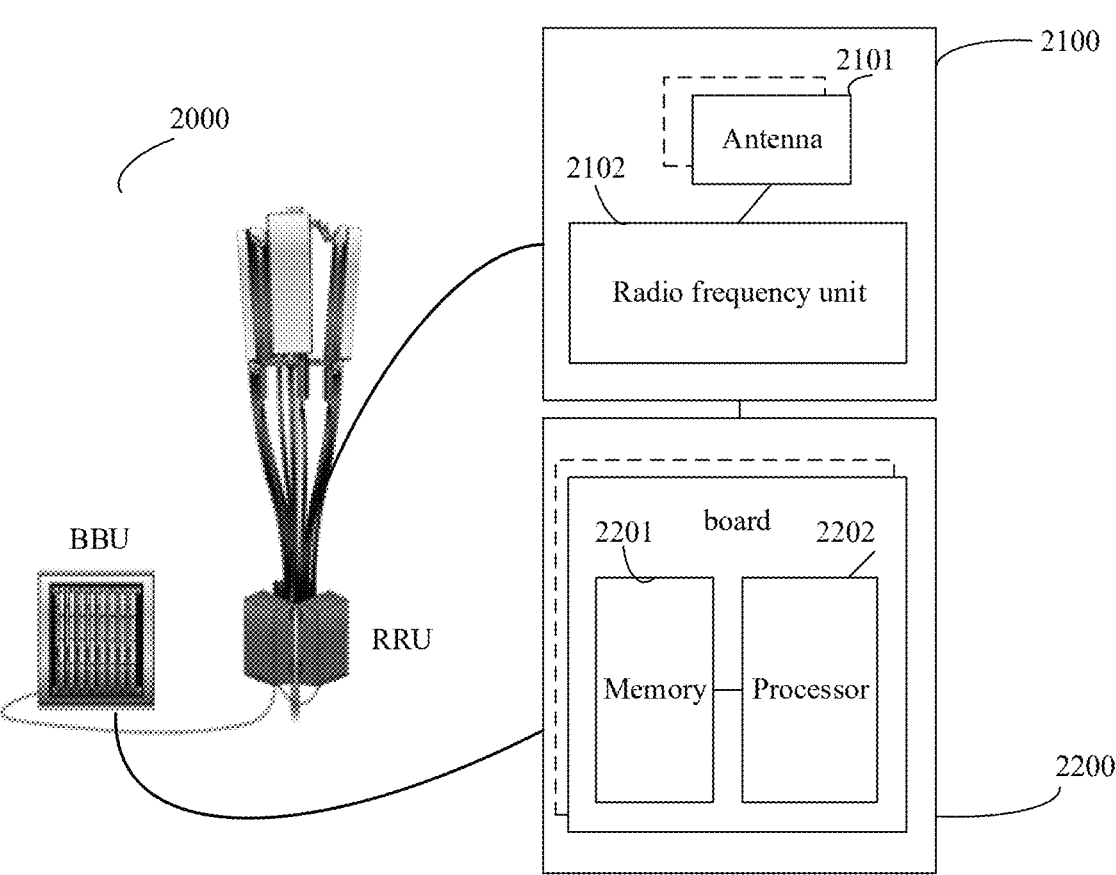
Figure 8:
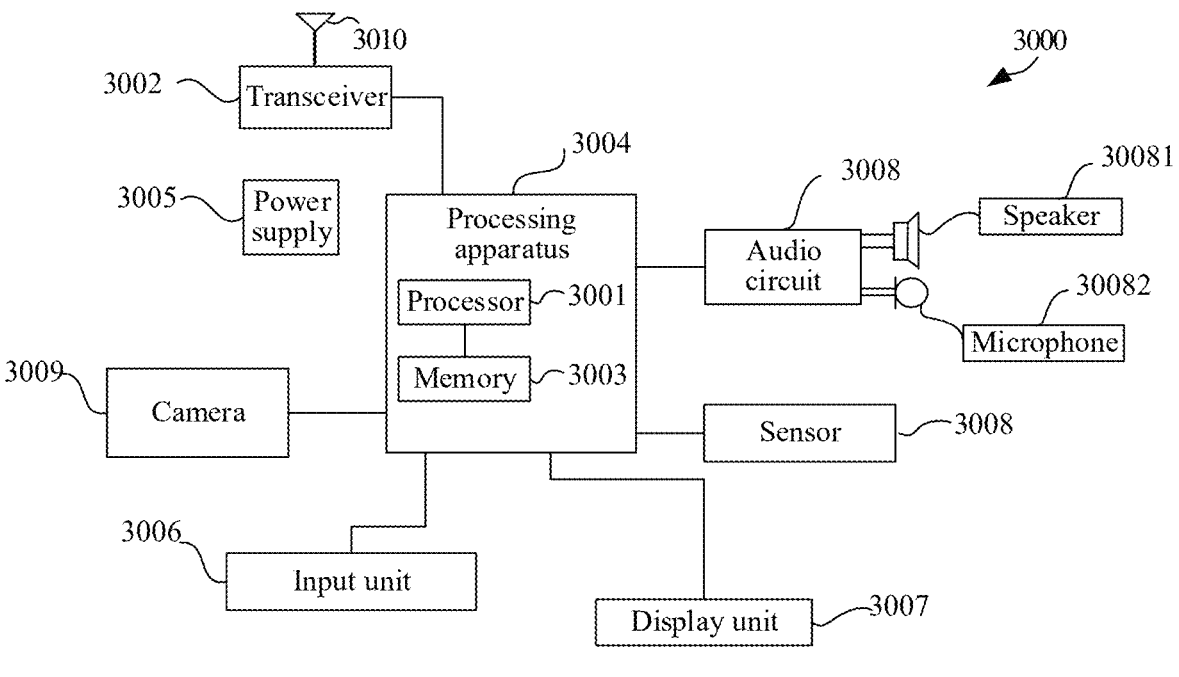

FIG. 5 (*b*) is another schematic diagram of an availability indication of a reference signal;

FIG. 5 (*c*) is still another schematic diagram of an availability indication of a reference signal;

FIG. 5 (*d*) is yet another schematic diagram of an availability indication of a reference signal;

FIG. 6 is a schematic diagram of a structure of a communication apparatus according to this application;

FIG. 7 is a schematic diagram of a structure of a network device according to this application; and FIG. 8 is a schematic diagram of a structure of a terminal device according to this application.

DESCRIPTION OF EMBODIMENTS

Technical solutions provided in this application may be applied to various communication systems, for example, a long term evolution (LTE) system, a 5th generation (5G) system, a new radio (NR) system, or another communication system that may appear in the future.

Figure 1:
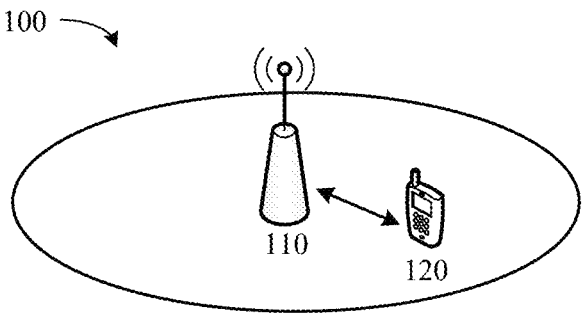
FIG. 1 is a schematic diagram of a communication system applicable to this application.

FIG. 1 is a schematic diagram of a communication system applicable to this application. As shown in FIG. 1, a communication system 100 may include at least one network device, for example, a network device 110 shown in FIG. 1. The communication system 100 may further include at least one terminal device, for example, a terminal device 120 shown in FIG. 1. The network device 110 may send a reference signal to the terminal device 120. The terminal device 120 may perform radio resource management (RRM) measurement, channel state information (CSI) measurement, time/frequency synchronization, beam management, channel estimation, and the like by using the reference signal. A terminal device in embodiments of this application may be user equipment (UE), an access terminal, a subscriber unit, a subscriber station, a mobile station, a mobile console, a remote station, a remote terminal, a mobile device, a user terminal, a terminal, a wireless communication device, a user agent, a user apparatus, or the like. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like. This is not limited in embodiments of this application.

A network device in embodiments of this application may be a device configured to communicate with the terminal device. For example, the network device may be a base station, an evolved NodeB (eNodeB), a transmission reception point (TRP), a next generation NodeB (gNB) in a 5G mobile communication system, a base station in a future mobile communication system, or an access node in a Wi-Fi system. For another example, the network device may alternatively be a module or a unit that completes some functions of the base station. For example, the network device may be a central unit (CU) or a distributed unit (DU). For still another example, the network device may alternatively be a radio controller, a relay station, an access point, a vehicle-mounted device, a wearable device, an access network device in another future evolved communication system, or the like in a cloud radio access network (CRAN) scenario. A specific technology and a specific device form that are used by the network device are not limited in this application.

In embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). An operating system may be any one or more types of computer operating systems that implement service processing through a process, for example, a Linux operating system, a Unix operating system, an Android operating system, an iOS operating system, or a Windows operating system. The application layer includes applications such as a browser, a contact list, word processing software, and instant messaging software. In addition, a specific structure of an execution body of a method provided in embodiments of this application is not particularly limited in embodiments of this application, provided that a program that records code of the method provided in embodiments of this application can be run to perform communication according to the method provided in embodiments of this application. For example, the execution body of the method provided in embodiments of this application may be the terminal device or the network device, or a function module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine readable media" may include but is not limited to a radio channel, and various other media that can store, contain, and/or carry instructions and/or data.

Before the method in this application is described, some concepts in this application are first described.

(1) Radio Resource Control (RRC) State

In the communication system, RRC states of the terminal device include an idle state (RRC_IDLE state), an inactive state (RRC_INACTIVE state), and a connected state (RRC_CONNECTED state).

When the terminal device is in the idle state, an air interface connection between the terminal device and the network device is disconnected, the terminal device no longer stores context information, and the terminal device can only receive broadcast information sent by the network device. When the terminal device is in the inactive state, the air interface connection between the terminal device and the network device is disconnected, but the terminal device continues to store the context information. When the terminal device enters the connected state from the inactive state, the terminal device can quickly restore to the connected state based on the stored context information. When the terminal device is in the connected state, the terminal device establishes an air interface connection to the network device, and communicates with the network device based on the air interface connection.

(2) Paging

There is no RRC connection between the terminal device in the idle state and the network device. Although the terminal device in the inactive state establishes an RRC connection to the network device, the connection is in a suspended state. When the network device has data to send to the terminal device in the idle state or in the inactive state, the network device first needs to page the terminal device, to notify the terminal device to establish or restore an RRC connection, and then data transmission can be performed. Paging may be initiated by a 5G core network (5GC), and such paging is also referred to as core network (CN) paging. Paging may alternatively be initiated by a radio access network (RAN), and such paging is also referred to as RAN paging.

(3) Discontinuous Reception (DRX)

The terminal device in the idle state or the inactive state supports receiving a paging message in a DRX manner, to reduce power consumption. Such DRX is also referred to as paging DRX. When the DRX is used to receive the paging message, the terminal device in the idle state or in the inactive state "wake up" only in a predefined time period to receive the paging message, and may remain in a "sleep" state in another time period, that is, stop receiving the paging message in the another time period. This reduces power consumption and increases a battery using time of the terminal device.

When the DRX is used to receive the paging message, a DRX cycle may also be referred to as a paging cycle. The DRX cycle may be configured by the network device. For example, the network device may configure the DRX cycle in the following manners:

Manner 1: For CN paging, a cell may broadcast a default DRX cycle by using an information element (IE) "default-PagingCycle" in a system information block (SIB) 1.

Manner 2: For CN paging, a non-access stratum (NAS) layer may configure a UE-specific DRX cycle by using IE "Paging DRX".

Manner 3: For RAN paging, the cell may configure a UE-specific DRX cycle by including IE "ran-PagingCycle" in an "RRC Release" message when the RRC connection is suspended.

For the terminal device in the idle state, if the UE-specific DRX cycle is configured in Manner 2, a minimum value of the default DRX cycle configured in Manner 1 and the UE-specific DRX cycle configured in Manner 2 may be used as a DRX cycle that is finally used. If there is no UE-specific DRX cycle configured in Manner 2, the default DRX cycle configured in Manner 1 is used.

The terminal device in the inactive state may use a minimum value of the default DRX cycle configured in Manner 1, the UE-specific DRX cycle configured in Manner 2, and the UE-specific DRX cycle configured in Manner 3 as the DRX cycle that is finally used.

(4) Paging Occasion (PO)

When the DRX is used to receive the paging message, the terminal device in the idle state or in the inactive state attempts to receive, only on a specific PO in each DRX cycle, a physical downlink control channel (PDCCH) scrambled by using a paging radio network temporary identifier (P-RNTI). The PO may be considered as a group of PDCCH monitoring occasions. One PO may include a plurality of time units. For example, the time unit may be a slot, or may be an orthogonal frequency division multiplexing (OFDM) symbol. The network device may send, on the PO, downlink control information (DCI) used to schedule the paging message. In addition, a paging frame (PF) is a radio frame, and may include one or more POs or start points of POs. When monitoring the PO, the terminal device first determines the PF, and then determines a PO associated with the PF. It should be noted that a start point of a PO associated with one PF may be located in the PF, or may be located after the PF. The terminal device may determine, based on a paging configuration parameter and an identifier of the terminal device, a PO that the terminal device needs to monitor.

Figure 2:
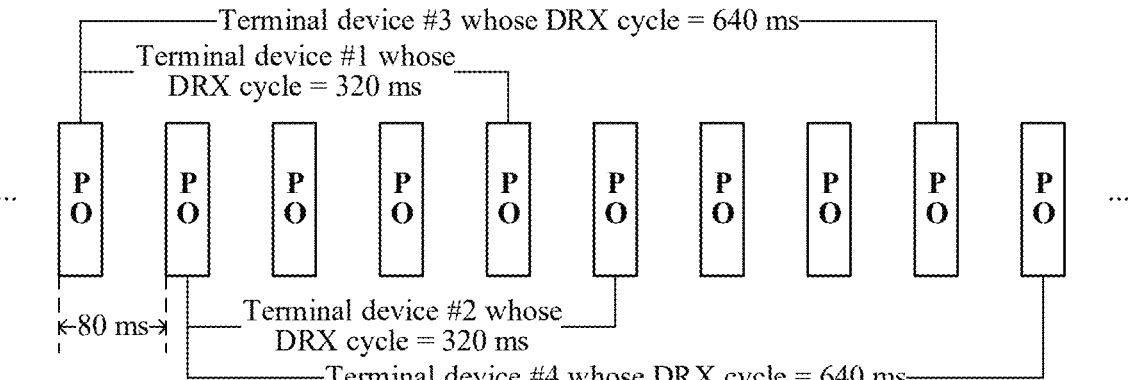
FIG. 2 is a schematic diagram of distribution of paging occasions.

For example, as shown in FIG. 2, the network device configures one PO every 80 ms, and for a specific terminal device, only some of the POs need to be monitored based on a DRX cycle of the specific terminal device. A DRX cycle of a terminal device #1 is 320 ms. A $1^{st}$ PO in the figure is monitored, and then a next PO is monitored at an interval of 320 ms. A DRX cycle of a terminal device #2 is 320 ms. A $2^{nd}$ PO in the figure is monitored, and then a next PO is monitored at an interval of 320 ms. A DRX cycle of a terminal device #3 is 640 ms. The $1^{st}$ PO in the figure is monitored, and then a next PO is monitored at an interval of 640 ms. A DRX cycle of a terminal device #4 is 640 ms. The $2^{nd}$ PO in the figure is monitored, and then a next PO is monitored at an interval of 640 ms.

In embodiments of this application, when the "interval" is used to describe a distance between two time units, the "interval" may indicate a distance between start points of the two time units, may indicate a distance between central points of the two time units, may alternatively indicate a distance between end points of the two time units, or may indicate a distance between a start point of one time unit and an end point of the other time unit. Herein, the two time units may be time units of same duration, or may be time units of different duration.

The following describes the technical solutions provided in this application with reference to the concepts described above.

In the LTE system, both the terminal device in the idle state and the terminal device in the connected state may perform measurement, time/frequency tracking, channel estimation, and the like by using a cell reference signal (CRS). The CRS is a reference signal that is always on. To reduce system overheads, an impact of inter-cell interference, and power consumption on a network device side, the NR system does not define a reference signal that is always on (always on), such as the CRS. Functions supported by the CRS in the LTE system are implemented by using different types of reference signals in the NR system. For example, a channel state information reference signal (CSI-RS) may be used for measuring downlink channel quality, and a tracking reference signal (TRS) may be used for time/frequency tracking and channel estimation. It should be noted that the CSI-RS and the TRS can be used only when the terminal device is in the connected state. The terminal device in the idle state and in the inactive state may perform measurement and time/frequency synchronization by using a synchronization signal block (SSB). Therefore, the terminal device in the idle state and in the inactive state needs to be woken up periodically to monitor the SSB.

Figures 3A, 3B:
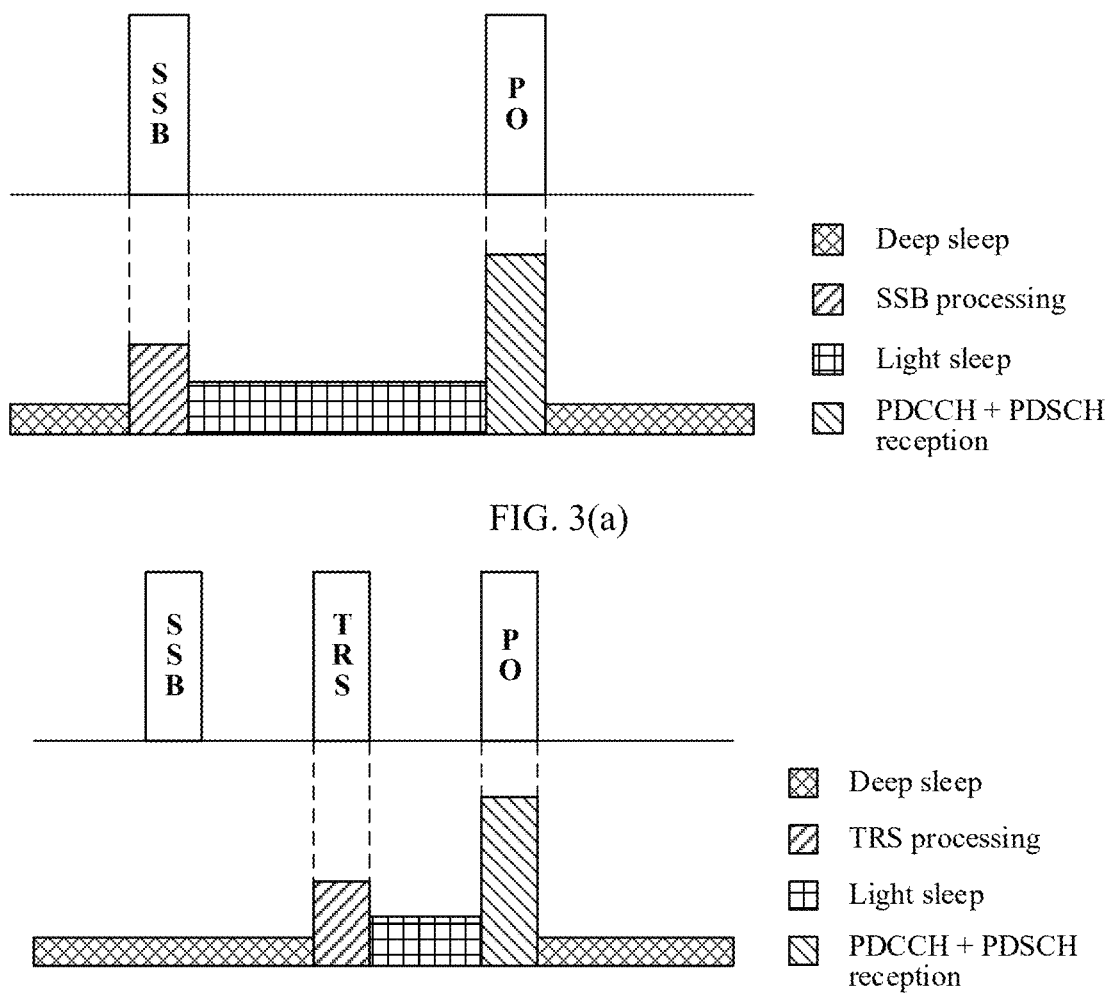
FIG. 3 (a) is a schematic diagram of power consumption in a process of monitoring paging.

To monitor the PO, the terminal device is woken up at a nearest SSB before the PO, and performs time/frequency synchronization by using the SSB. Thereafter, the terminal device needs to remain in a wake-up state or a light sleep mode, and keep obtained time/frequency synchronization until an end of the PO. FIG. 3 (a) is a schematic diagram of power consumption in a paging reception process of a terminal device. Rectangles with patterns in the figure represent different power consumption states of the terminal device, and heights of these rectangles represent values of power consumption in the states. It can be learned from the figure that power consumption per unit duration in a deep sleep mode is lower than power consumption per unit duration in the light sleep mode. A larger interval between the SSB and the PO indicates higher power consumption of the terminal device. The simplest method to reduce power consumption due to the interval between the SSB and the PO is to send the SSB more frequently. However, from a perspective of system overhead, this method is undesirable, and is contrary to an original intention that an always-on reference signal is canceled in the NR system.

In addition to sending the SSB more frequently, it may be alternatively considered that the terminal device in the idle state and the inactive state can use a reference signal such as the CSI-RS or the TRS. FIG. 3 (b) is a schematic diagram of power consumption in a paging reception process of a terminal device capable of using a TRS. For a meaning of rectangles with patterns, refer to the foregoing descriptions of FIG. 3 (a). It can be learned from the figure that if the terminal device uses a TRS configured between a PO and an SSB, the terminal device may stay in the deep sleep mode for a longer time. Because power consumption per unit duration in the deep sleep mode is lower than power consumption per unit duration in the light sleep mode, extending duration of being in the deep sleep mode can reduce power consumption of the terminal device.

To enable the terminal device to skip the SSB to receive a reference signal, the terminal device needs to know in advance whether there is the reference signal between the SSB and the PO. Otherwise, to ensure demodulation performance on the PO where a PDCCH (for example, paging DCI) and/or a physical downlink shared channel (PDSCH) is received, the terminal device still needs to wake up at the SSB to perform time/frequency synchronization.

Figure 4:
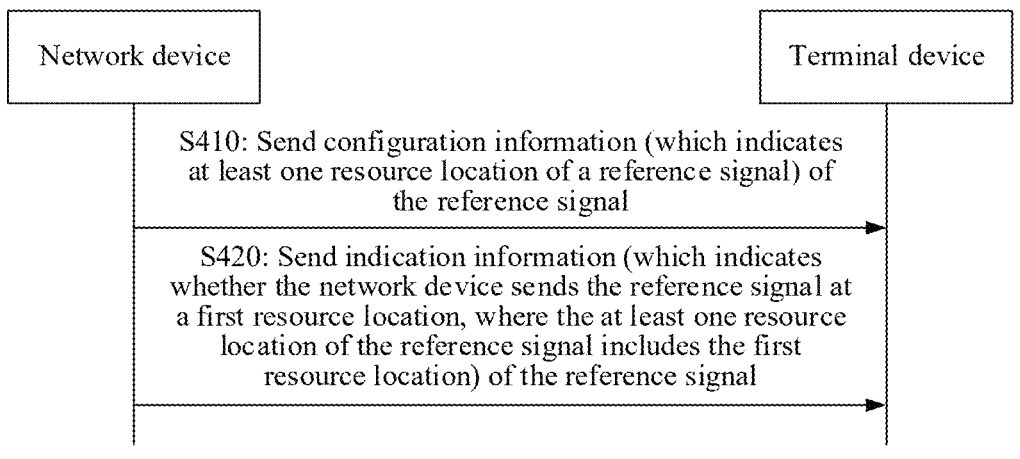
FIG. 4 is a schematic diagram of a reference signal indication method according to this application.
Figure 5A:
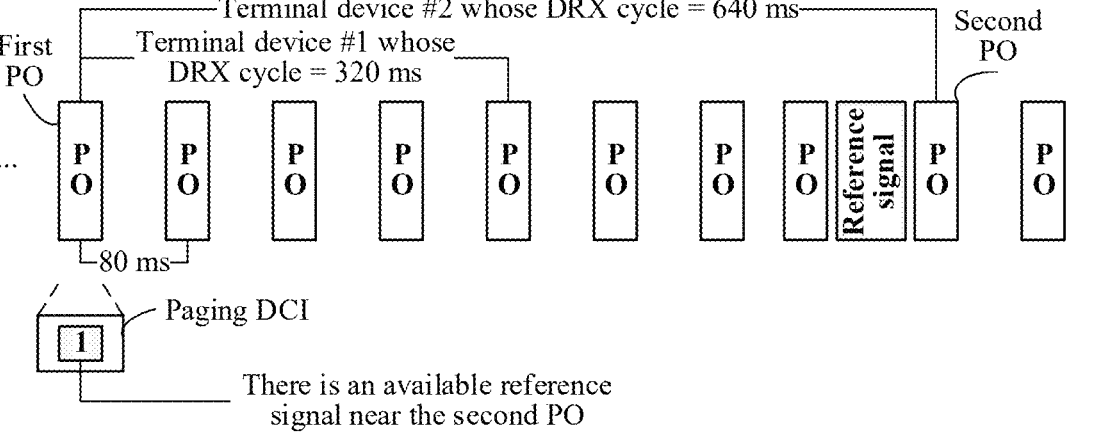
FIG. 5 (a) is a schematic diagram of an availability indication of a reference signal.
Figure 5B:
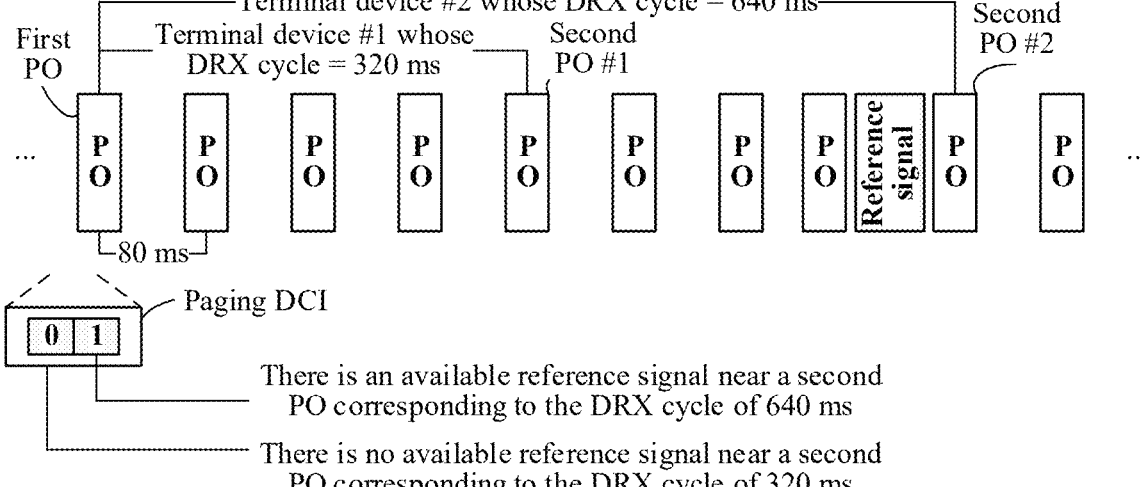
Figure 5C:
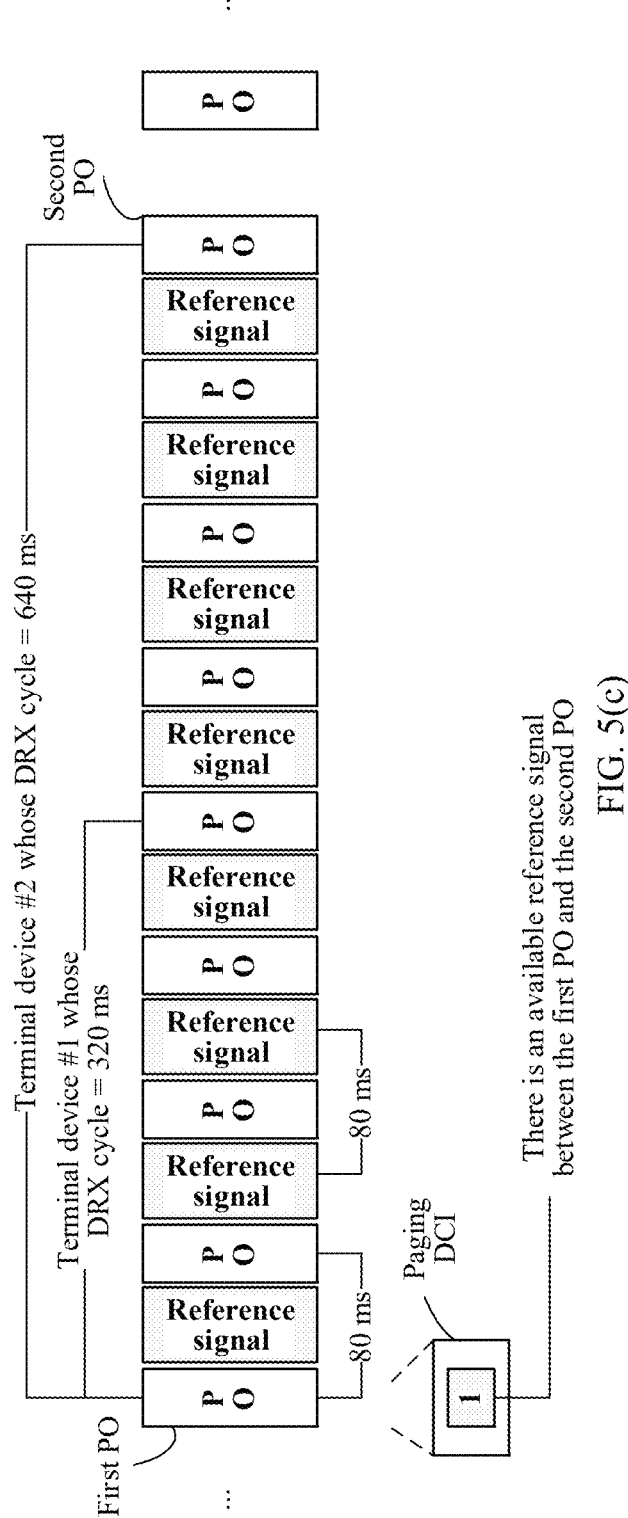
Figure 5D:
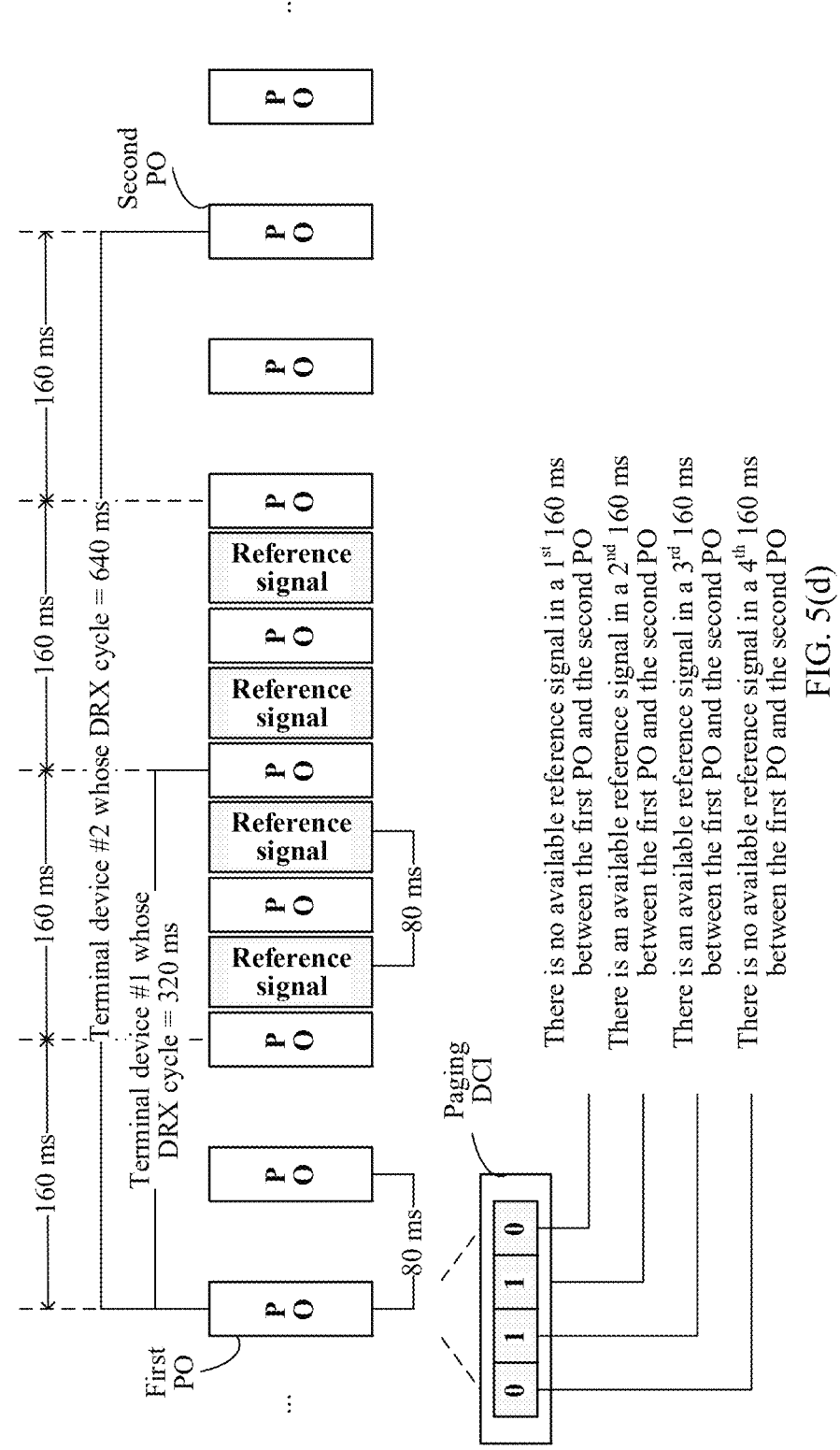

Therefore, this application provides a reference signal indication method. FIG. 4 is a schematic flowchart of the method. As shown in the figure, the method includes step S410 and step S420. The steps shown in FIG. 4 are described below.

S410: A network device sends configuration information of a reference signal to a terminal device, and correspondingly, the terminal device receives the configuration information of the reference signal from the network device.

Herein, the configuration information of the reference signal indicates at least one resource location of the reference signal. It should be understood that, indication information that can enable the terminal device to determine, based on the indication information, the at least one resource location of the reference signal may be considered to indicate whether the network device sends the reference signal at a first resource location, regardless of whether the indication information has another function or whether the indication information is an explicit indication or an implicit indication.

As described above, the reference signal may be a TRS, a CSI-RS, or the like. The network device may configure the reference signal to be sent periodically. For example, the network device configures a resource location of at least one reference signal at an equal interval, and then chooses to send the reference signal at all or some resource locations. Alternatively, the network device may configure the reference signal to be bound to a PO. For example, the network device configures at least one PO, and the terminal device determines a resource location of at least one reference signal based on offset information between the PO and the reference signal. The offset information may be received from the network device, or may be learned of in another manner. For example, the configuration information may be a preset value, for example, an offset value. When a communication system supports multi-beam transmission, the reference signal may be sent in a plurality of beam directions. In this case, the configuration information of the reference signal may include a plurality of sets of configurations, and each set of configurations corresponds to one beam direction.

S420: The network device sends indication information of the reference signal to the terminal device, and correspondingly, the terminal device receives the indication information of the reference signal from the network device.

Herein, the indication information of the reference signal indicates whether the network device sends the reference signal at the first resource location. It should be understood that, indication information that can enable the terminal device to determine, based on the indication information, whether the network device sends the reference signal at the first resource location may be considered to indicate whether the network device sends the reference signal at the first resource location, regardless of whether the indication information has another function or whether the indication information is an explicit indication or an implicit indication. The indication information of the reference signal may only indicate the network device to send the reference signal at the first resource location, or may only indicate the network device not to send the reference signal at the first resource location. Alternatively, different values of the indication information of the reference signal respectively indicate whether the network device sends the reference signal at the first resource location.

The indication information of the reference signal may be carried in DCI received on the PO, and the DCI may be referred to as paging DCI. For an NR system, the DCI may be used to carry scheduling information of a short message and/or a paging message. A format of the DCI may be a DCI format 1_0 scrambled by using a paging radio network temporary identifier (P-RNTI) through redundancy check (CRC). The indication information of the reference signal may be indicated by using an added field in the paging DCI, an original function field in the paging DCI, or a reserved field in the paging DCI.

Alternatively, the indication information of the reference signal may be carried in a signal that indicates whether the terminal device monitors a subsequent PO. The signal may be a paging advance indication signal or a power saving signal, for example, a wake-up signal (WUS), a go-to-sleep signal, and the like. For ease of description, a PO used to receive the indication information is referred to as a first PO below, or a PO located after a signal used to receive the indication information is referred to as a first PO below. The first PO may be a $1^{st}$ PO located after the signal used to receive the indication information, may be at least one PO associated with the signal used to receive the indication information, may be one of the at least one PO (for example, a subsequent PO, where whether the subsequent PO needs to be monitored is indicated by the signal) associated with the signal used to receive the indication information, may be a $1^{st}$ PO of the at least one PO associated with the signal used to receive the indication information, may be a PO that is in the at least one PO associated with the signal used to receive the indication information and that is closest to a time domain location of the signal, or may be a PO determined according to a rule. It should be noted that, a function of the signal described herein indicates whether the terminal device monitors the subsequent PO. The subsequent PO may be at least one PO after the first PO, and the at least one PO and the first PO may be POs that need to be monitored by a same terminal device, or may be POs that need to be monitored by different terminal devices. For a specific method for determining a PO location by the terminal device, refer to an existing technology in an LTE system or an NR system.

The at least one resource location of the reference signal includes the first resource location. The first resource location may be one resource location, or may be a plurality of resource locations. When the first resource location is a plurality of resource locations, the indication information of the reference signal may respectively indicate, for each resource location, whether the network device sends the reference signal at the resource location.

The first resource location of the reference signal may be a resource location of a reference signal corresponding to the at least one PO after the first PO. For ease of description, a PO corresponding to the first resource location of the reference signal is referred to as a second PO below. An interval between the first PO and the second PO may be configured by the network device, may be a preset value, or may be obtained based on a parameter and a preset value configured by the network device. For example, the interval between the first PO and the second PO may be an integer multiple of a cycle of the reference signal. The cycle of the reference signal may be indicated by the configuration information of the reference signal, and the multiple may be a preset value, or may be indicated by the network device. Alternatively, the interval between the first PO and the second PO may be a DRX cycle, and a specific DRX cycle or DRX cycles may be preset. For example, the interval between the first PO and the second PO may be a default DRX cycle. When there are a plurality of default DRX cycles, the interval between the first PO and the second PO may be a minimum value in the default DRX cycles, or may be a maximum value in the default DRX cycles. Alternatively, there may be a plurality of second POs, and intervals between the first PO and the second POs are different default DRX cycles.

Specifically, the first resource location of the reference signal may be a resource location of a reference signal near the second PO. When an interval between the resource location of the reference signal and the second PO is less than or equal to a specific threshold, the resource location of the reference signal may be considered as the resource location of the reference signal near the second PO. The threshold may be configured by the network device, or may be a preset value. Alternatively, when the reference signal is a reference signal that is bound to a PO at a location, the resource location of the reference signal may be considered as the resource location of the reference signal near the second PO. Alternatively, if the terminal device performs synchronization by using a specific reference signal, demodulation performance on the second PO can be ensured, and the resource location of the reference signal may be considered as the resource location of the reference signal near the second PO. Only a resource location of a reference signal that is located before the second PO or that belongs to a same slot, symbol, or the like as the second PO may be considered. When there are resource locations of a plurality of reference signals that meet the foregoing requirements, the first resource location may be a resource location that is in these resource locations and that is of a reference signal closest to the second PO.

Alternatively, the first resource location of the reference signal may be a resource location of a reference signal located between the first PO and the second PO. An indication may be performed for an entire time period of the interval between the first PO and the second PO, or the interval between the first PO and the second PO may be divided into a plurality of time periods, and each time period is indicated respectively. All resource locations of reference signals between the first PO and the second PO configured by the network device may all belong to the first resource location, or configured resource locations of only some reference signals may belong to the first resource location. In this case, the network device and the terminal device need to reach a consensus on which configured resource locations of reference signals belong to the first resource location.

It should be noted that the first PO and the second PO may be POs that need to be monitored by a same terminal device, or may be POs that need to be monitored by different terminal devices. For the specific method for determining the PO location by the terminal device, refer to the existing technology in the LTE or NR system.

It should be understood that, although the foregoing describes, by using the second PO as a reference, resource locations of reference signals at which the network device sends the reference signal, actually, a manner in which the terminal device learns of the resource locations of these reference signals by using another reference is also applicable to the technical solutions provided in this application. For example, the indication information of the reference signal may indicate the network device to send a reference signal at a resource location of a reference signal that is in at least one time period. A start location of the time period is the first PO, and a length of the time period is an integer multiple of a cycle of the reference signal, a default DRX cycle, or the like.

By using the configuration information and the indication information of the reference signal, the terminal device can determine resource locations at which the network device sends the reference signal, to learn whether demodulation performance on a subsequent PO that needs to be monitored can be ensured by receiving the reference signal. Further, if the demodulation performance on the PO cannot be ensured by receiving the reference signal, and the terminal device still needs to be woken up at a nearest SSB before the PO, the terminal device may alternatively determine whether the terminal device is woken up at the nearest SSB before the subsequent PO that needs to be monitored. In addition, a network side only needs to send the reference signal in a specific time period to ensure the demodulation performance on the PO. This can reduce overheads of the network device.

The following describes the first resource location of the reference signal in four cases with reference to specific examples.

(1) The First Resource Location of the Reference Signal is a Resource Location Near One PO.

As described above, the first resource location of the reference signal may be the resource location of the reference signal near the second PO, and the second PO may be a PO after the first PO. In other words, the indication information of the reference signal indicates whether the network device sends the reference signal at a resource location of a reference signal near the subsequent PO. If the indication information indicates the network device to send the reference signal at the resource location of the reference signal near the PO, and the terminal device determines that the PO needs to be monitored, and the reference signal may be received at the resource location of the reference signal.

The indication information of the reference signal may be one bit. When a value of the bit is "1", it may indicate that the network device sends the reference signal at the resource location of the reference signal near the PO; and when the value of the bit is "0", it may indicate that the network device does not send the reference signal at the resource location of the reference signal near the PO.

As described above, the interval between the first PO and the second PO may be configured by the network device, may be a preset value, or may be obtained based on the parameter and the preset value configured by the network device. The interval between the first PO and the second PO may be an integer multiple of a cycle of the reference signal, or may be a DRX cycle, for example, the default DRX cycle, the minimum value in the default DRX cycles, or the maximum value in the default DRX cycles.

The following describes the manner by using an example with reference to FIG. 5 (*a*). As shown in FIG. 5 (*a*), a network device configures one PO every 80 ms. A DRX cycle of a terminal device #1 is 320 ms. A $1^{st}$ PO in the figure is monitored, and then a next PO is monitored at an interval of 320 ms. A DRX cycle of a terminal device #2 is 640 ms. The $1^{st}$ PO in the figure is monitored, and then a next PO is monitored at an interval of 640 ms. Paging DCI sent on a first PO (that is, the $1^{st}$ PO in the figure) carries 1-bit indication information whose value is "1". The indication information "1" indicates the network device to send a reference signal at a resource location of a reference signal corresponding to a second PO (that is, the last but one PO in the figure). The resource location of the reference signal is shown in the figure. It may be understood as that the indication information is for a next PO corresponding to a DRX cycle of 640 ms.

According to the indication information, the terminal device #2 can learn that demodulation performance on the second PO can be ensured by receiving the reference signal, and does not need to be woken up at a nearest SSB before the second PO.

In addition to the resource location of the reference signal, the network device may further configure resource locations of other reference signals, for example, a resource location of a reference signal corresponding to the last but two PO in the figure. However, the network device may not send the reference signal at these resource locations.

The indication information carried in the paging DCI sent on the first PO is applicable only to the terminal device #2 whose DRX cycle is 640 ms, and is not applicable to the terminal device #1 whose DRX cycle is 320 ms. In addition, for a next PO (that is, a $5^{th}$ PO in the figure) monitored by the terminal device #1 after the first PO, FIG. 5 does not show that the network device sends the reference signal at a resource location of a reference signal corresponding to the PO. However, actually, if the terminal device #1 monitors a PO at an interval of 320 ms before the first PO, the network device may include the indication information whose value is "1" in the paging DCI sent on the PO. In this way, the terminal device #1 may learn that the network device sends the reference signal at a resource location of a reference signal corresponding to a PO at an interval of 320 ms after the first PO.

An advantage of this manner is that overheads of the indication information of the reference signal are reduced, and overheads of sending the reference signal by the network device are low.

(2) The First Resource Location of the Reference Signal is a Resource Location Near at Least One PO.

As described above, the first resource location of the reference signal may be a resource location of a reference signal near the second PO, and the second PO may be at least one PO after the first PO. In other words, the indication information of the reference signal indicates whether the network device sends the reference signal at a resource location of a reference signal that is near at least one subsequent PO. When an indication is performed for only one PO, similar to (1), if the indication information indicates the network device to send the reference signal at a resource location of a reference signal near the PO, and the terminal device determines that the PO needs to be monitored, the reference signal may be received at the resource location of the reference signal. When the indication is performed for more than one PO, if the indication information indicates the network device to send the reference signal at a resource location of a reference signal near a specific PO of these POs, and the terminal device needs to monitor the PO, the reference signal may be received at the resource location of the reference signal.

The indication information of the reference signal may be a bit group, and a quantity of bits included in the bit group is the same as a quantity of POs corresponding to the indication information. Each bit in the bit group corresponds to one PO, that is, at least one bit is in a one-to-one correspondence with at least one PO. When a value of a bit is "1", it may indicate that the network device sends the reference signal at a resource location of a reference signal that is near a PO corresponding to the bit; and when the value of the bit is "0", it may indicate that the network device does not send the reference signal at the resource location of the reference signal that is near the PO corresponding to the bit.

As described above, an interval between the first PO and the second PO may be configured by the network device, may be a preset value, or may be obtained based on a parameter and a preset value configured by the network device. The interval between the first PO and the second PO may be an integer multiple of a cycle of the reference signal, or may be a DRX cycle, for example, a default DRX cycle, a minimum value in default DRX cycles, or a maximum value in default DRX cycles. When the interval between the first PO and the second PO is the DRX cycle, that each bit in the bit group corresponds to one PO may alternatively be understood as that each bit in the bit group corresponds to one DRX cycle. A low bit may correspond to a small DRX cycle, and a high bit may correspond to a large DRX cycle, or vice versa.

The quantity of bits included in the bit group may be a preset value. For example, the preset value may be a positive integer from 1 to 6.

Alternatively, the quantity of bits included in the bit group may be a quantity of entries of a configuration parameter of the default DRX cycle. For example, when all entries of the configuration parameter of the default DRX cycle are 320 ms, 640 ms, 1280 ms, and 2560 ms, the quantity of these entries is 4. Therefore, the quantity of bits included in the bit group is 4.

Alternatively, the quantity of bits included in the bit group may be a quantity of entries that are less than or equal to entries of the default DRX cycle and that are in the entries of the configuration parameter of the DRX cycle. For example, when all entries of the configuration parameter of the default DRX cycle are 320 ms, 640 ms, 1280 ms, and 2560 ms, if a default DRX cycle configured by the network device is 1280 ms, entries that are in these entries and that are less than or equal to that of the default DRX cycle are 320 ms, 640 ms, and 1280 ms, and a quantity of the entries is 3. Therefore, the quantity of bits included in the bit group is 3. As described above, a DRX cycle finally used by the terminal device is a minimum value of the default DRX cycle of the terminal device and a specific DRX cycle. Therefore, the DRX cycle finally used by the terminal device is definitely less than or equal to the default DRX cycle.

The following describes the manner by using an example with reference to FIG. 5 (b). As shown in FIG. 5 (b), a network device configures one PO every 80 ms. A DRX cycle of a terminal device #1 is 320 ms. A $1^{st}$ PO in the figure is monitored, and then a next PO is monitored at an interval of 320 ms. A DRX cycle of a terminal device #2 is 640 ms. The $1^{st}$ PO in the figure is monitored, and then a next PO is monitored at an interval of 640 ms. Paging DCI sent on a first PO (that is, the $1^{st}$ PO in the figure) carries 2-bit indication information whose value is "01". A $1^{st}$ bit "0" of the indication information indicates the network device not to send a reference signal at a resource location of a reference signal corresponding to a second PO #1 (that is, a $5^{th}$ PO in the figure). A $2^{nd}$ bit "1" of the indication information indicates the network device to send a reference signal at a resource location of a reference signal corresponding to a second PO #2. The resource location of the reference signal is shown in the figure. It may be understood as that the $1^{st}$ bit of the indication information corresponds to a next PO corresponding to the DRX cycle of 320 ms, and the $2^{nd}$ bit corresponds to a next PO corresponding to the DRX cycle of 640 ms.

According to the indication information, the terminal device #1 can learn that demodulation performance on the second PO #1 cannot be ensured by receiving the reference signal, and needs to be woken up at a nearest SSB before the second PO #1. In addition, according to the indication information, the terminal device #2 can learn that demodulation performance on the second PO #2 can be ensured by receiving the reference signal, and does not need to be woken up at a nearest SSB before the second PO #2.

In addition to the resource location of the reference signal, the network device may further configure resource locations of other reference signals, for example, a resource location of a reference signal corresponding to the last but two PO. However, the network device may not send the reference signal at these resource locations.

An advantage of this manner is that resource locations of reference signals near different quantities of POs can be selected as required, and indicated. In addition, when resource locations of reference signals near a plurality of POs are indicated, whether there is a reference signal sent at resource locations of reference signals near different POs can be respectively indicated. This enhances indication flexibility. In addition, overheads of sending the reference signal by the network device are small.

(3) The First Resource Location of the Reference Signal is a Resource Location in a Time Period.

As described above, the first resource location of the reference signal may be a resource location of a reference signal located between the first PO and the second PO, and may be indicated for an entire time period between the first PO and the second PO. In other words, the indication information of the reference signal indicates whether the network device sends the reference signal at a resource location of a reference signal that is in a subsequent time period. If the indication information indicates the network device to send the reference signal at resource locations of reference signals that are in the time period, and the terminal device determines that a PO near a specific reference signal of the reference signals needs to be monitored, the reference signal may be received at a resource location of the reference signal.

The indication information of the reference signal may be one bit. When a value of the bit is "1", it may indicate that the network device sends the reference signal at the resource location of the reference signal that is in the time period; and when the value of the bit is "0", it may indicate that the network device does not send the reference signal at the resource location of the reference signal that is in the time period.

As described above, an interval between the first PO and the second PO may be configured by the network device, may be a preset value, or may be obtained based on a parameter and a preset value configured by the network device. The interval between the first PO and the second PO may be an integer multiple of a cycle of the reference signal, or may be a DRX cycle, for example, a default DRX cycle, a minimum value in default DRX cycles, or a maximum value in default DRX cycles.

The following describes the manner by using an example with reference to FIG. 5 (c). As shown in FIG. 5 (c), a network device configures one PO every 80 ms, and configures a resource location of a reference signal every 80 ms. A DRX cycle of a terminal device #1 is 320 ms. A $1^{st}$ PO in the figure is monitored, and then a next PO is monitored at an interval of 320 ms. A DRX cycle of a terminal device #2 is 640 ms. The $1^{st}$ PO in the figure is monitored, and then a next PO is monitored at an interval of 640 ms. Paging DCI sent on a first PO (that is, the $1^{st}$ PO in the figure) carries 1-bit indication information whose value is "1". The indication information "1" indicates the network device to send the reference signal at a resource location of a reference signal located between the first PO and the second PO (that is, the last but one PO in the figure). Resource locations of reference signals are shown in the figure. It may be understood as that the indication information is for a time period that starts from the first PO and whose duration is 640 ms.

According to the indication information, the terminal device #1 can learn, by receiving a specific reference signal (for example, a $4^{th}$ reference signal in the figure) of these reference signals, that demodulation performance on a PO (that is, a $5^{th}$ PO in the figure) at an interval of 320 ms after the $1^{st}$ PO can be ensured, and does not need to be woken up at a nearest SSB before the PO. In addition, according to the indication information, the terminal device #2 can learn that demodulation performance on the second PO can be ensured by receiving a specific reference signal (for example, the last reference signal in the figure) of these reference signals, and does not need to be woken up at the nearest SSB before the second PO.

In addition to the resource locations of these reference signals, the network device may further configure resource locations of other reference signals, for example, a resource location of a reference signal at an interval of 80 ms after the last reference signal in the figure. However, the network device may not send the reference signal at these resource locations.

An advantage of this manner is that overheads of the indication information of the reference signal are reduced. In addition, in some cases, there may be a high probability that the terminal device can ensure demodulation performance on the PO by receiving the reference signal.

(4) the First Resource Location of the Reference Signal is a Resource Location in at Least One Time Period.

As described above, the first resource location of the reference signal may be a resource location of a reference signal located between the first PO and the second PO, or may be indicated for an entire time period of an interval between the first PO and the second PO based on an actual situation. Alternatively, the interval between the first PO and the second PO is divided into a plurality of time periods, and each time period is indicated respectively. When there are a plurality of time periods, the time periods may be of equal length, or may be of non-equal length. It should be understood that, although "divided" is used for description herein, "divided" is used only to describe a relationship between the interval between the first PO and the second PO and the plurality of time periods described above. Actually, there may be no division processing, and the network device and the terminal device may directly determine the plurality of time periods. In other words, the indication information of the reference signal indicates whether the network device sends the reference signal at a resource location of a reference signal that is in at least one subsequent time period. If the indication information indicates the network device to send the reference signal at resource locations of reference signals that are in a specific time period of time periods, and the terminal device determines that a PO near a specific reference signal of the reference signals needs to be monitored, the reference signal may be received at a resource location of the reference signal.

The indication information of the reference signal may be a bit group, and a quantity of bits included in the bit group is the same as a quantity of time periods corresponding to the indication information. Each bit in the bit group corresponds to one time period, that is, at least one bit is in a one-to-one correspondence with at least one time period. When a value of a bit is "1", it may indicate that the network device sends the reference signal at a resource location of a reference signal that is in a time period corresponding to the bit; and when the value of the bit is "0", it may indicate that the network device does not send the reference signal at the resource location of the reference signal that is in the time period corresponding to the bit.

As described above, the interval between the first PO and the second PO may be configured by the network device, may be a preset value, or may be obtained based on a parameter and a preset value configured by the network device. The interval between the first PO and the second PO may be an integer multiple of a cycle of the reference signal, or may be a DRX cycle, for example, a default DRX cycle, a minimum value in default DRX cycles, or a maximum value in default DRX cycles. Setting may be performed for the interval between the first PO and the second PO, and then setting may be performed for a quantity of time periods in the interval and division. Alternatively, setting may be directly performed for the at least one time period. Alternatively, the plurality of time periods may be defaulted to be of equal length, setting may be performed for the interval between the first PO and the second PO, and then setting may be performed for a duration of each time period. The "setting" herein may be understood as setting performed by the network device through configuration and/or by using the preset value as described above. For the at least one time period, each time period may be an integer multiple of the cycle of the reference signal. For example, each time period is one cycle of the reference signal. Alternatively, each time period may be a DRX cycle, for example, a minimum value in default DRX cycles, or a minimum value in a specific DRX cycle.

The following describes the manner by using an example with reference to FIG. 5 (d). As shown in FIG. 5 (d), a network device configures one PO every 80 ms, and configures a resource location of a reference signal every 80 ms. A DRX cycle of a terminal device #1 is 320 ms. A 1$^{st}$ PO in the figure is monitored, and then a next PO is monitored at an interval of 320 ms. A DRX cycle of a terminal device #2 is 640 ms. The 1$^{st}$ PO in the figure is monitored, and then a next PO is monitored at an interval of 640 ms. Paging DCI sent on a first PO (that is, the 1$^{st}$ PO in the figure) carries 4-bit indication information whose value is "0110". A time period between the first PO and a second PO (that is, the last but one PO in the figure) is divided into four time periods whose duration is 160 ms. A 1$^{st}$ bit "0" indicates the network device not to send the reference signal at a resource location of a reference signal that is in a 1$^{st}$ 160 ms time period. A 2$^{nd}$ bit "1" indicates the network device to send the reference signal at a resource location of a reference signal that is in a 2$^{nd}$ 160 ms time period. Resource locations of reference signals are shown in the figure. A 3$^{rd}$ bit "1" indicates the network device to send the reference signal at a resource location of a reference signal that is in a 3$^{rd}$ 160 ms time period. Resource locations of reference signals are shown in the figure. A 4$^{th}$ bit "0" indicates the network device not to send the reference signal at a resource location of a reference signal that is in a 4$^{th}$ 160 ms time period. It may be understood as that the 1$^{st}$ bit of the indication information is for a time period that starts from the first PO and whose duration is 160 ms, the 2$^{nd}$ bit of the indication information is for a time period that is at an interval of 160 ms after the first PO and whose duration is 160 ms, the 3$^{rd}$ bit of the indication information is for a time period that is at an interval of 320 ms after the first PO and whose duration is 160 ms, and the 4$^{th}$ bit of the indication information is for a time period that is at an interval of 480 ms after the first PO and whose duration is 160 ms.

According to the indication information, the terminal device #1 can learn, by receiving a specific reference signal (for example, a 4$^{th}$ reference signal in the figure) of these reference signals, that demodulation performance on a PO (that is, a 5$^{th}$ PO in the figure) at an interval of 320 ms after the 1$^{st}$ PO can be ensured, and does not need to be woken up at a nearest SSB before the PO. In addition, according to the indication information, the terminal device #2 can learn that demodulation performance on the second PO cannot be ensured by receiving the reference signal, and needs to be woken up at a nearest SSB before the second PO.

In addition to the resource locations of these reference signals, the network device may further configure resource locations of other reference signals, for example, a resource location of a reference signal at an interval of 80 ms after the last reference signal in the figure. However, the network device may not send the reference signal at these resource locations.

An advantage of this manner is that resource locations of reference signals in time periods of different quantities and granularities can be selected as required, and indicated. Alternatively, when resource locations of reference signals in a plurality of time periods are indicated, whether there is a reference signal sent at resource locations of reference signals that are in different time periods can be respectively indicated. This enhances indication flexibility. In addition, in some cases, there may be a high probability that the terminal device can ensure demodulation performance on the PO by receiving the reference signal, and overheads of sending the reference signal by the network device are small.

It should be understood that the solutions in embodiments of this application may be properly combined for use, and explanations or descriptions of terms in embodiments may be mutually referenced or explained in embodiments. This is not limited.

In addition, in embodiments of this application, sequence numbers of the foregoing processes do not mean execution sequences. The execution sequences of the processes should be determined based on functions and internal logic of the processes. Numbers or sequence numbers in the foregoing processes are merely for differentiation for ease of description, and should not constitute any limitation on an implementation process of embodiments of this application.

In addition, in the foregoing described method embodiments, only an example in which execution bodies are a network device and a terminal device is used. The network device may alternatively be replaced with a chip or the like disposed in the network device, and the terminal device may alternatively be replaced with a chip or the like disposed in the terminal device.

The foregoing describes in detail the method provided in embodiments of this application with reference to FIG. 4. Apparatuses provided in embodiments of this application are described below in detail with reference to FIG. 6 to FIG. 8.

FIG. 6 is a schematic block diagram of a communication apparatus according to an embodiment of this application. As shown in FIG. 6, a communication device 1000 may include a transceiver unit 1100.

In an embodiment, the communication device 1000 may correspond to a network device in the method provided in embodiments of this application. The communication device 1000 may be a network device or a chip configured in the network device. Units in the communication device 1000 are respectively configured to implement operations performed by the network device in a corresponding method.

The transceiver unit 1100 may be configured to send configuration information of a reference signal to a terminal device. The configuration information of the reference signal indicates at least one resource location of the reference signal.

The transceiver unit 1100 may be further configured to send indication information of the reference signal to the terminal device. The indication information of the reference signal indicates whether the network device sends the reference signal at a first resource location. The at least one resource location of the reference signal includes the first resource location.

In another embodiment, the communication device 1000 may correspond to a terminal device in the method provided in embodiments of this application. The communication device 1000 may be the terminal device or a chip configured in the terminal device. Units in the communication device 1000 are respectively configured to implement operations performed by the terminal device in a corresponding method.

The transceiver unit 1100 may be configured to receive the configuration information of the reference signal from the network device. The configuration information of the reference signal indicates the at least one resource location of the reference signal.

The transceiver unit 1100 may be further configured to receive the indication information of the reference signal from the network device. The indication information of the reference signal indicates whether the network device sends the reference signal at the first resource location. The at least one resource location of the reference signal includes the first resource location.

It should be understood that a specific process in which the units perform the foregoing corresponding steps is described in detail in the foregoing method embodiments, and for brevity, details are not described herein again.

It should be further understood that when the communication device 1000 is the network device, the transceiver unit 1100 in the communication device 1000 may correspond to a remote radio unit (RRU) 2100 in a network device 2000 shown in FIG. 7. When the communication device 1000 is the chip configured in the network device, the transceiver unit 1100 in the communication device 1000 may be an input/output interface.

It should be further understood that when the communication device 1000 is the terminal device, the transceiver unit 1100 in the communication device 1000 may correspond to a transceiver 3002 in a terminal device 3000 shown in FIG. 8.

FIG. 7 is a schematic diagram of a structure of a network device 2000 according to an embodiment of this application. The network device 2000 may be applied to the system shown in FIG. 1, to perform functions of the network device in the foregoing method embodiments. As shown in the figure, the network device 2000 may include one or more radio frequency units, such as an RRU 2100 and one or more baseband units (BBUs) (which may also be referred to as DUs) 2200. The RRU 2100 may be referred to as a transceiver unit or a communication unit, and corresponds to the transceiver unit 1100 in FIG. 6. Optionally, the transceiver unit 2100 may also be referred to as a transceiver, a transceiver circuit, or the like, and may include at least one antenna 2101 and a radio frequency unit 2102. Optionally, the transceiver unit 2100 may include a receiving unit and a sending unit. The receiving unit may correspond to a receiver (or referred to as a receiver machine or a receiver circuit), and the sending unit may correspond to a transmitter (or referred to as a transmitter machine or a transmitter circuit). The RRU 2100 is mainly configured to send and receive a radio frequency signal and perform conversion between the radio frequency signal and a baseband signal. The BBU 2200 is mainly configured to perform baseband processing, control a network device, and the like. The RRU 2100 and the BBU 2200 may be physically disposed together, or may be physically disposed respectively, namely, a distributed base station.

The BBU 2200 is a control center of the network device, or may also be referred to as a processing unit, and is mainly configured to complete baseband processing functions, such as channel coding, multiplexing, modulation, and spectrum spreading. For example, the BBU may be configured to control the network device to perform an operation procedure related to the network device in the foregoing method embodiments.

In an example, the BBU 2200 may include one or more boards. A plurality of boards may jointly support a radio access network (for example, an LTE network) having a single access standard, or may respectively support radio access networks (for example, the LTE network, a 5G network, or another network) having different access standards. The BBU 2200 further includes a memory 2201 and a processor 2202. The memory 2201 is configured to store necessary instructions and data. The processor 2202 is configured to control the network device to perform a necessary action, for example, is configured to control the network device to perform the operation procedure related to the network device in the foregoing method embodiments. The memory 2201 and the processor 2202 may serve the one or more boards. That is, a memory and a processor may be respectively disposed on each board. Alternatively, a plurality of boards may share a same memory and a same processor. In addition, a necessary circuit may be alternatively disposed on each board.

It should be understood that the network device 2000 shown in FIG. 7 can implement processes related to the network device in the foregoing method embodiments. Operations or functions of modules in the network device 2000 are respectively intended to implement corresponding procedures in the foregoing method embodiments. For details, refer to the descriptions in the foregoing method embodiments. To avoid repetition, detailed descriptions are properly omitted herein.

The BBU 2200 may be configured to perform an action that is implemented inside the network device and that is described in the foregoing method embodiments. The RRU 2100 may be configured to perform an action of sending by the network device to the terminal device or receiving from the terminal device in the foregoing method embodiments. For details, refer to the descriptions in the foregoing method embodiments. Details are not described herein again.

FIG. 8 is a schematic diagram of a structure of a terminal device 3000 according to an embodiment of this application. As shown in the figure, the terminal device 3000 includes a processor 3001 and a transceiver 3002. Optionally, the terminal device 3000 may further include a memory 3003. The processor 3001, the transceiver 3002, and the memory 3003 may communicate with each other through an internal connection path, and transfer a control signal and/or a data signal. The memory 3003 is configured to store a computer program. The processor 3001 is configured to invoke the computer program from the memory 3003 and run the computer program, to control the transceiver 3002 to receive and send a signal.

The processor 3001 and the memory 3003 may be integrated into one processing apparatus 3004. The processor 3001 is configured to execute program code stored in the memory 3003 to implement the foregoing function. It should be understood that the processing apparatus 3004 shown in the figure is merely an example. During specific implementation, the memory 3003 may alternatively be integrated into the processor 3001, or may be independent of the processor 3001. This is not limited in this application.

The terminal device 3000 may further include an antenna 3010, configured to send, by using a radio signal, uplink data or uplink control signaling output by the transceiver 3002.

It should be understood that the terminal device 3000 shown in FIG. 8 can implement processes related to the terminal device in the foregoing method embodiments. Operations or functions of modules in the terminal device 3000 are respectively intended to implement corresponding procedures in the foregoing method embodiments. For details, refer to the descriptions in the foregoing method embodiments. To avoid repetition, detailed descriptions are properly omitted herein.

Optionally, the terminal device 3000 may further include a power supply 3005, configured to supply power to various components or circuits in the terminal device.

In addition, to improve functions of the terminal device, the terminal device 3000 may further include one or more of an input unit 3006, a display unit 3007, an audio circuit 3008, a camera 3009, a sensor 3008, and the like. The audio circuit 3008 may further include a speaker 30081, a microphone 30082, and the like.

It should be understood that the processing apparatus 3004 may be a chip. For example, the processing apparatus 3004 may be a field programmable gate array (FPGA), may be a general-purpose processor, a digital signal processor (DSP), an application-specific integrated circuit (ASIC), the field programmable gate array (FPGA), another programmable logic device, a discrete gate, a transistor logic device, or a discrete hardware component, may be a system on chip (SoC), may be a central processing unit (CPU), may be a network processor (NP), may be a digital signal processing circuit (digital signal processor (DSP)), may be a micro controller unit (MCU), or may be a programmable controller (PLD) or another integrated chip. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The memory 3003 may be a volatile memory or a non-volatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that the memory in the system and the method described in this specification is intended to include, but not limited to, these memories and any memory of another proper type.

An embodiment of this application further provides a computer program product. The computer program product includes a computer program. When the computer program is run on a computer, the computer is enabled to perform the method performed by the network device or the terminal device in the foregoing method embodiments.

An embodiment of this application further provides a computer-readable medium. The computer-readable medium stores a computer program. When code of the computer program is run on a computer, the computer is enabled to perform the method performed by the network device or the terminal device in the foregoing method embodiments.

An embodiment of this application further provides a system. The system includes a terminal device and an access network device.

An embodiment of this application further provides a communication apparatus. The communication apparatus includes a processor and a storage medium. The storage medium stores instructions. When the instructions are run by the processor, the communication apparatus is enabled to perform the method performed by the network device or the terminal device in the foregoing method embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedures or functions according to the embodiments of this application are generated. The computer may be a general-purpose computer, a dedicated computer, a computer network, or other programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state drive (SSD)), or the like.

In this specification, terms such as "component", "module", and "system" indicate computer-related entities, hardware, firmware, combinations of hardware and software, software, or software being executed. For example, a component may be but is not limited to a process that is run on a processor, a processor, an object, an executable file, an execution thread, a program, or a computer. As illustrated by using figures, both a computing device and an application that is run on the computing device may be components. One or more components may reside within a process or an execution thread, and a component may be located on one computer or distributed between two or more computers. In addition, these components may be executed from various computer-readable media that store various data structures. For example, the components may communicate by using a local or remote process based on a signal having one or more data terminal device groups (for example, data from two components interacting with another component in a local system, in a distributed system, or across a network such as the Internet interacting with another system by using the signal).

It should be understood that, an "embodiment" mentioned throughout this specification means that particular features, structures, or characteristics related to this embodiment are included in at least one embodiment of this application. Therefore, embodiments in the entire specification do not necessarily refer to a same embodiment. In addition, these particular features, structures, or characteristics may be combined in one or more embodiments by using any appropriate manner.

It should be understood that, in embodiments of this application, numbers "first", "second", and the like are merely for distinguishing between different objects, for example, to distinguish between different network devices, and do not constitute a limitation on the scope of embodiments of this application. Embodiments of this application are not limited thereto.

In addition, in this application, both "when" and "if" mean that a network element performs corresponding processing in an objective situation, but do not constitute a limitation on time, do not require that the network element has a determining action during implementation, and do not mean other limitations either.

In addition, in this application, "at least one" means one or more, and "a plurality of" means two or more.

It should be further understood that, in embodiments of this application, "B corresponding to A" indicates that B is associated with A, and B may be determined based on A. However, it should be further understood that determining B based on A does not mean that B is determined only based on A, and B may alternatively be determined based on A and/or other information.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification may represent an "or" relationship between the associated objects. For example, when "/" is used for "and/or", it may alternatively represent an "and/or" relationship between the associated objects, for example, when "/" is used for "time/frequency".

Unless otherwise specified, an expression used in this application similar to an expression that "at least one of A, B, and C" usually means that the entry may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and other combinations of A, B and C. In the foregoing descriptions, three elements A, B, and C are used as an example to describe an optional case of the entry. When there are more elements in the expression, the meaning of the expression may be obtained according to the foregoing rules.

It may be understood that, in embodiments of this application, the terminal device and/or the network device may perform some or all steps in embodiments of this application. These steps or operations are merely examples. In embodiments of this application, other operations or variations of various operations may alternatively be performed. In addition, the steps may be performed in a sequence different from a sequence presented in embodiments of this application, and not all the operations in embodiments of this application may be performed.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate components may or may not be physically separate, and components displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one unit, each of the units may exist alone physically, or two or more units may be integrated into one unit.

If the functions are implemented in a form of a software functional unit and sold or used as an independent product, the functions may be stored in a computer-readable storage medium. Based on such an understanding, the technical solutions of this application essentially, or the part contributing to the existing technology, or some of the technical solutions may be implemented in a form of a software product. The computer software product is stored in a storage medium, and includes several instructions for indicating a computer device (which may be a personal computer, a server, or a network device) to perform all or some of the steps of the methods described in the embodiments of this application. The foregoing storage medium includes any medium that can store program code, such as a USB flash drive, a removable hard disk, a ROM, a RAM, a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A reference signal indication method comprising:
receiving configuration information of a reference signal from a network device, wherein the configuration information indicates at least one resource location of the reference signal; and
receiving indication information of the reference signal from the network device, wherein the indication information indicates whether the network device sends the reference signal at a first resource location, and the at least one resource location comprises the first resource location,
wherein the indication information is carried in downlink control information (DCI) received on a first paging occasion (PO), or the indication information is carried in a first signal received before a first PO, wherein the first signal indicates whether a terminal device monitors a subsequent PO, and
wherein the first resource location corresponds to a second PO, and the second PO is at least one PO after the first PO.

2. The method according to claim 1, wherein an interval between the first PO and the second PO is an integer multiple of a cycle of the reference signal;
an interval between the first PO and the second PO is a discontinuous reception (DRX) cycle;
an interval between the first PO and the second PO is a default DRX cycle;
an interval between the first PO and the second PO is a minimum value in default DRX cycles; or
an interval between the first PO and the second PO is a maximum value in default DRX cycles.

3. The method according to claim 1, wherein that the first resource location corresponds to a second PO comprises:
an interval between the first resource location and the second PO is less than or equal to a first threshold; or
there is an offset value between the first resource location and the second PO; or
the first resource location is a resource location that is in the at least one resource location and that is located in a first time period, wherein
the first time period is the interval between the first PO and the second PO; or
the first time period is at least one time period, wherein the at least one time period forms the interval between the first PO and the second PO.

4. A reference signal indication apparatus comprising at least one processor, wherein the at least one processor is configured to:
receive configuration information of a reference signal from a network device, wherein the configuration information indicates at least one resource location of the reference signal;
receive indication information of the reference signal from the network device, wherein the indication information indicates whether the network device sends the reference signal at a first resource location, and the at least one resource location comprises the first resource location,
wherein the indication information is carried in downlink control information (DCI) received on a first paging occasion (PO), or the indication information is carried in a first signal received before a first PO, wherein the first signal indicates whether a terminal device monitors a subsequent PO, and
wherein the first resource location corresponds to a second PO, and the second PO is at least one PO after the first PO.

5. The apparatus according to claim 4, wherein an interval between the first PO and the second PO is an integer multiple of a cycle of the reference signal;
an interval between the first PO and the second PO is a discontinuous reception (DRX) cycle;
an interval between the first PO and the second PO is a default DRX cycle;
an interval between the first PO and the second PO is a minimum value in default DRX cycles; or
an interval between the first PO and the second PO is a maximum value in default DRX cycles.

6. The apparatus according to claim 4, wherein that the first resource location corresponds to a second PO comprises:
an interval between the first resource location and the second PO is less than or equal to a first threshold; or
there is an offset value between the first resource location and the second PO;

the first resource location is a resource location that is in the at least one resource location and that is located in a first time period, wherein the first time period is the interval between the first PO and the second PO; or the first time period is at least one time period, wherein the at least one time period forms the interval between the first PO and the second PO.

7. A reference signal indication method comprising:

sending configuration information of a reference signal to a terminal device, wherein the configuration information indicates at least one resource location of the reference signal; and sending indication information of the reference signal to the terminal device, wherein the indication information indicates whether a network device sends the reference signal at a first resource location, and the at least one resource location comprises the first resource location, wherein the indication information is carried in downlink control information (DCI) received on a first paging occasion (PO), or the indication information is carried in a first signal received before a first PO, wherein the first signal indicates whether a terminal device monitors a subsequent PO, and wherein the first resource location corresponds to a second PO, and the second PO is at least one PO after the first PO.

8. The method according to claim 7, wherein that the first resource location corresponds to a second PO comprises:

an interval between the first resource location and the second PO is less than or equal to a first threshold; or there is an offset value between the first resource location and the second PO; or the first resource location is a resource location that is in the at least one resource location and that is located in a first time period, wherein the first time period is the interval between the first PO and the second PO; or the first time period is at least one time period, wherein the at least one time period forms the interval between the first PO and the second PO.

9. The method according to claim 7, wherein an interval between the first PO and the second PO is an integer multiple of a cycle of the reference signal;

an interval between the first PO and the second PO is a discontinuous reception (DRX) cycle;

an interval between the first PO and the second PO is a default DRX cycle;

an interval between the first PO and the second PO is a minimum value in default DRX cycles; or

28 an interval between the first PO and the second PO is a maximum value in default DRX cycles.

10. A reference signal indication apparatus comprising at least one processor, wherein the at least one processor is configured to:

send configuration information of a reference signal to a terminal device, wherein the configuration information indicates at least one resource location of the reference signal;

send indication information of the reference signal to the terminal device, wherein the indication information indicates whether the network device sends the reference signal at a first resource location, and the at least one resource location comprises the first resource location, wherein the indication information is carried in downlink control information (DCI) received on a first paging occasion (PO), or the indication information is carried in a first signal received before a first PO, wherein the first signal indicates whether a terminal device monitors a subsequent PO, and wherein the first resource location corresponds to a second PO, and the second PO is at least one PO after the first PO.

11. The apparatus according to claim 10, wherein an interval between the first PO and the second PO is an integer multiple of a cycle of the reference signal;

an interval between the first PO and the second PO is a discontinuous reception (DRX) cycle;

an interval between the first PO and the second PO is a default DRX cycle;

an interval between the first PO and the second PO is a minimum value in default DRX cycles; or an interval between the first PO and the second PO is a maximum value in default DRX cycles.

12. The apparatus according to claim 11, wherein that the first resource location corresponds to a second PO comprises:

an interval between the first resource location and the second PO is less than or equal to a first threshold; or there is an offset value between the first resource location and the second PO;

the first resource location is a resource location that is in the at least one resource location and that is located in a first time period, wherein the first time period is the interval between the first PO and the second PO; or the first time period is at least one time period, wherein the at least one time period forms the interval between the first PO and the second PO.

* * * * *